United States Patent [19]

Schultz et al.

[11] Patent Number: 4,700,300

[45] Date of Patent: * Oct. 13, 1987

[54] INDICATING BAREHOLE RUGOSITY AS A FUNCTION OF THE DIFFERENCE BETWEEN SHALLOW AND DEEP LOG INDICES

[75] Inventors: Ward E. Schultz; Harry D. Smith, Jr., both of Houston, Tex.

[73] Assignee: Halliburton Company, Duncan, Okla.

[ * ] Notice: The portion of the term of this patent subsequent to May 12, 2004 has been disclaimed.

[21] Appl. No.: 625,349

[22] Filed: Jun. 27, 1984

[51] Int. Cl.$^4$ .......................... G01V 1/28; G01V 1/36; G06F 15/20

[52] U.S. Cl. .................................... 364/422; 250/256; 364/571; 364/575; 367/43; 367/45

[58] Field of Search ............... 364/422, 421, 724, 571, 364/575; 367/43, 45; 256/256, 266, 270

[56] References Cited

U.S. PATENT DOCUMENTS 3,256,480  6/1966  Runge .................................. 364/422

4,458,340  7/1984  Lautzenhiser ......................... 367/32

OTHER PUBLICATIONS

"Applications of Digital Filtering Techniques to Nuclear Well Logs"; W. E. Schultz and S. G. Thadani; SPWLA, 22nd Annual Logging Symposium, Jun. 23-26, 1981.

Primary Examiner—Jerry Smith
Assistant Examiner—G. Hayes
Attorney, Agent, or Firm—William J. Beard

[57] ABSTRACT

Statistical variations in simultaneous shallow and deep investigation nuclear borehole logs are reduced using digital moving average data processing while maintaining responsiveness to formation changes, by transitioning through a combination of long and short filtered data as a function of the statistical variation of the deep log data differences of the long and short derived averages. Borehole rugosity is also indicated as a function of the difference between the shallow and the deep log indexes of the differences between their respective narrow and wide derived averages.

16 Claims, 5 Drawing Figures

INDICATING BAREHOLE RUGOSITY AS A FUNCTION OF THE DIFFERENCE BETWEEN SHALLOW AND DEEP LOG INDICES

CROSS REFERENCE TO RELATED APPLICATION

Reference is made to co-pending U.S. application Ser. No. 625,345, filed June 27, 1984, entitled Method and Apparatus for Reducing Statistical Variations in Nuclear Well Logs, and assigned to the assignee of the present invention.

BACKGROUND OF THE INVENTION

The present invention relates to nuclear well logging, and more particularly to statistical methods and apparatus for processing data from both shallow and deep radii of investigation, for improving the quality of such nuclear well logs, and for indicating borehole rugosity.

In nuclear well logging, the data which is produced (e.g., count rates of specific events in one or more detectors) is highly statistical in nature. This therefore presents data enhancement problems unlike those in other types of well logging (e.g., electrical) in which the raw data signals are continuous. Continuous signals provide ample challenges for improving formation bed resolution, but do not suffer from the statistical variations which can plague nuclear logging.

Nuclear logging statistical variations (which become worse when, due to the tool or the formation, the count rates are low) are often a limiting factor in obtaining precise interpretation from nuclear logs. Digital log processing allows the application of enhanced filtering techniques. The goal is to reduce statistical fluctuations while maintaining adequate response to formation changes. Alternatively, improved filtering permits increased logging speeds without degrading log quality.

More particularly, most nuclear well logs are based on counting rate measurement from gamma ray or neutron detectors. As indicated, low counting rates or high logging speeds increase the statistical uncertainties of the measurements. Averaging by analog or digital methods is normally employed to reduce these statistical fluctuations. However, excessive averaging degrades the observation of sudden changes in counting rate, such as might occur at formation bed boundaries.

In analog processing systems, resistor-capacitor combinations are selected with desired time constants to filter the counting rates. Variable time constants ("statistical dampeners") are often used that continuously adapt to varying count rates and reduce statistical fluctuations while maintaining formation bed resolution.

In digital computer logging systems, moving-average filters are often implemented in place of analog filters. An averaging interval can be selected to yield a reduction in statistical fluctuations that is similar to a particular analog time constant. However, some type of adaptive digital filtering is required to match the performance of analog statistical dampeners.

One type of adaptive digital filter can be provided by combining several digital filters known as "moving-average" filters. A moving-average filter may be understood as a running average of data samples. When a new sample is obtained, the oldest sample is deleted and a new average is calculated from the new sample plus the remaining samples. For nuclear logs, each data sample is normally a detector counting rate (count per second) observed during a small time or depth increment. Filtering the data samples reduces statistical fluctuations that are often excessive between individual samples. However, both analog and digital filters usually have the undesirable effect of also smoothing out true formation changes. The longer the filter "length" (roughly equivalent to the length of the borehole interval being "averaged" or otherwise processed), the more likely that a thin formation will be missed, will not be fully resolved, will be misinterpreted as a thicker formation, or will otherwise be incorrectly logged. Further, when the logging involves simultaneous measurements at different depths of investigation, the measurements will ordinarily be related, and it may therefore be possible to develop statistical methods which thereby enhance the overall results.

A need therefore remains for a method and apparatus for use with nuclear borehole logs which include data from both shallow and deep radii of investigation, and which can effectively reduce statistical variations in such logs while maintaining responsiveness to formation changes. Preferably, such a method and apparatus will also indicate borehole rugosity, and will be uncomplicated in concept and implementation, capable of efficient operation in real time logging situations, inexpensive, versatile, reliable, accurate, and readily applicable to the widest possible use with nuclear well logging techniques.

SUMMARY OF THE INVENTION

Briefly, the present invention meets the above needs and purposes with a real-time technique utilizing a significant improvement upon the combination of moving-average filters as described in "Applications of Digital Filtering Techniques to Nuclear Well Logs", by Ward E. Schultz and Suresh G. Thadani (SPWLA Twenty-Second Annual Logging Symposium, June 23, 1981). As described therein, one of the filters was used to average over a fairly narrow or short depth interval, yielding good resolution of formation bedding. Another filter averaged over a much longer or wider interval, and therefore had a smaller statistical variation (but also poorer bed resolution). By adaptively combining the two averages, statistical fluctuations were reduced while retaining significant log features.

The combined moving averages described therein yielded better results than a conventional moving average. However, in many cases the results were still not sufficiently improved. In particular, a type of "ringing" often resulted at the point where a transistion was made from one moving average to another. This appeared, for example, as small "spikes" on the well log, caused because each moving average has its own real-time value. These values will usually not be the same when the measured data is changing (because the intervals over which the averages are taken are intentionally different). Therefore, when the value being logged is switched from one average to the other, the discontinuity in the value will result in the ringing or "spike" on the log.

In the preferred embodiment of the present invention, this transition is significantly smoothed by transitioning through a linear combination of the filtered data. Thus, in those situations which are intermediately between the situations calling for the long filter length and the short filter length, an average of them both will be used. Statistical means are specified for selecting among the long, short, and averaged values.

Further, the present invention expressly recognizes that the narrow averaging interval is a subset of the wide interval. Additionally, it is recognized herein that it is ordinarily preferable, where the detectors have different radii of investigation, to control the amount of adaptive filtering for the shallower detector (or data) from the deeper sensing detector (or data), the deeper being farther from borehole effects.

More particularly, the present invention provides both a method and apparatus for processing data from nuclear borehole logs which include data from both shallow and deep radii of investigation, and for additionally indicating borehole rugosity as a function of the difference between the shallow and the deep log indexes (described below). First, narrow digital moving averages of the shallow and deep log data are derived using a first relatively narrow interval, thereby yielding relatively good formation bed resolution. Next (and usually simultaneously), wide digital moving averages of the shallow and deep log data are derived using a second interval wider than the first, to produce a smaller statistical variation in the log data than is produced by using the narrow interval. Then, using the deep log data, a deep log index of the difference between the narrow and the wide derived averages is derived. The index in the preferred embodiment is the arithmetic difference between the narrow and the wide derived deep log averages.

Next, three ranges for the deep log index are defined as follows. The first range is that wherein the deep log index is less than two times the statistical standard deviation from zero for the difference between the deep log narrow and wide averages. The second range is the range wherein the index is between two and three times that standard deviation. The third range is the range wherein the index is greater than three times that standard deviation (the third range indicating that a statistically significant change has occurred). Then, in preparing the log of the borehole, the wide derived average is used when the index is in the first range. The mean of the wide and narrow derived averages is used when the index falls into the second range. The narrow derived average is used when the index is in the third range.

Finally, borehole rugosity may be indicated as a function of the difference between the shallow and the deep log indexes.

It is therefore a feature of the present invention to provide an improved method and apparatus for processing data from nuclear borehole logs which include data from both shallow and deep radii of investigation, and for reducing statistical variations therein while maintaining responsiveness to formation changes; a method and apparatus which derives both narrow and wide digital moving averages of both the shallow and deep log data by respectively using a relatively narrow interval (thereby yielding relatively good formation bed resolution) and another interval wider than the first (thereby producing a smaller statistical variation in the log data than is produced by using the narrow interval); which derives, from the deep log data, a deep log index of the difference between the narrow and the wide derived averages; which then uses the wide derived average when the deep log index falls into a first range; which may use a predetermined combination of the wide and narrow derived averages when the deep log index falls into a second range; and which uses the narrow derived average when the index falls into a third range; which may derived from the shallow measurement data a first signal indicative of the variations in the shallow data relative to the variations therein which would be attributable to count rate statistics; which may also derive from the deep measurement data a second signal indicative of the variations in the deep data relative to the variations therein which would be attributable to count rate statistics; and which may derive from the first and second signals an output signal indicative of borehole rugosity; and to accomplish the above features in a method and apparatus which will also indicate borehole rugosity, and will be uncomplicated in concept and implementation, capable of efficient operation in real time logging situations, inexpensive, versatile, reliable, accurate, and readily applicable to the widest possible use with nuclear well logging techniques.

Other features and advantages of the invention will be apparent from the following description, the accompanying drawings and the appended claims.

DESCRIPTION OF THE PREFERRED EMBODIMENT

With reference to the drawings, the new and improved apparatus for processing data from nuclear borehole logs which include data from both shallow and deep radii of investigation, and for reducing statistical variations therein while maintaining responsiveness to formation changes, and the method therefor according to the present invention, will be described.

Figure 1:
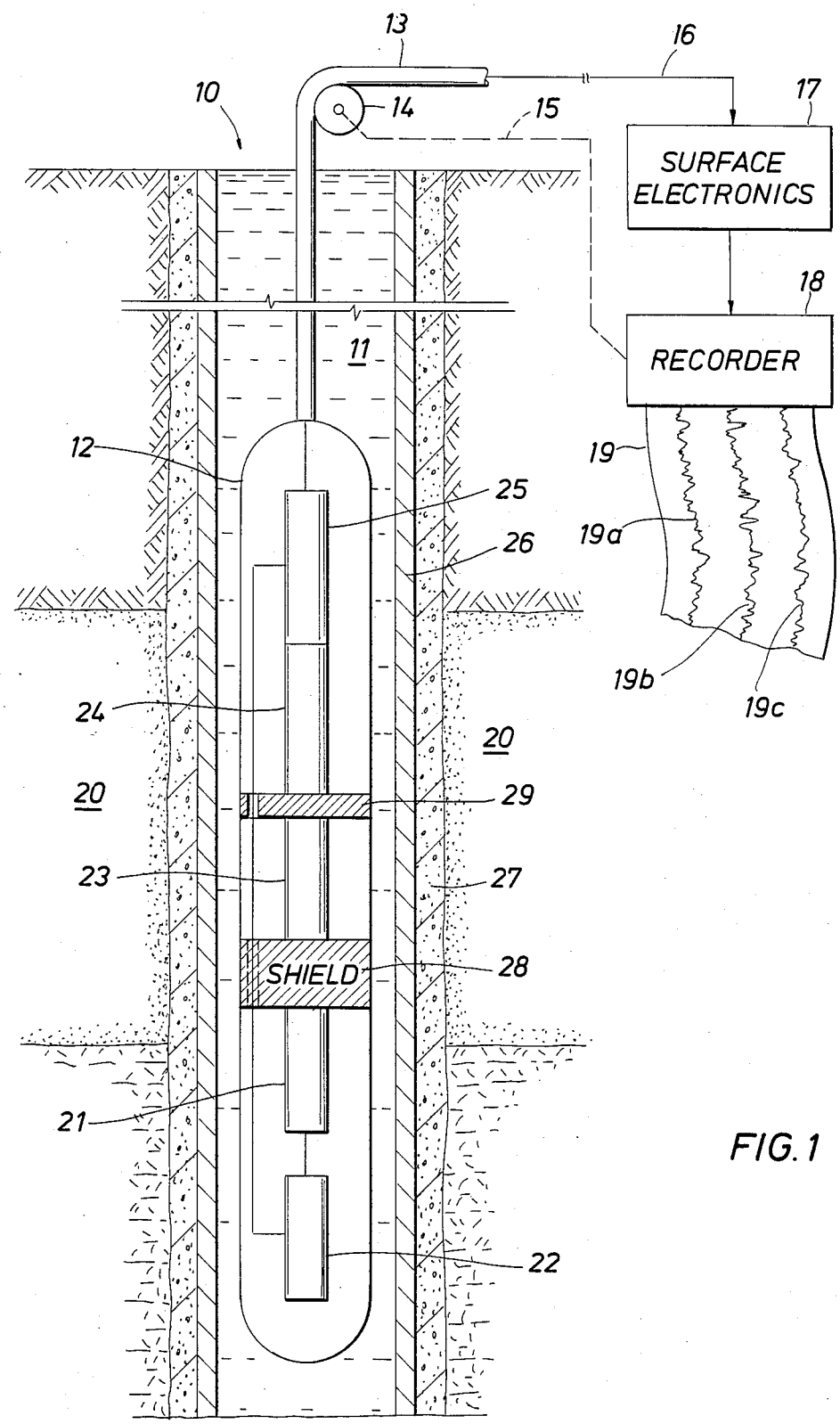
FIG. 1 is a schematic illustration showing a well logging system for performing nuclear earth formation measurements in a borehole according to the present invention.

Referring to FIG. 1, a well logging system in accordance with the concepts of the present invention is illustrated schematically. A well borehole 10, which is filled with a borehole fluid 11, penetrates the earth formations 20 under investigation. A downhole well logging sonde 12 is suspended in the borehole 10 via a conventional armored logging cable 13, in a manner known in the art, such that the sonde 12 may be raised and lowered through the borehole as desired. The well logging cable 13 passes over a sheave wheel 14 at the surface. The sheave wheel is electrically or mechanically coupled, as indicated by dotted line 15, to a well logging recorder 18 which may comprise an optical recorder, or magnetic tape, or both, as known in the art. Recorder 18 is shown making a record on a conventional paper chart 19 having curves 19a, 19b, and 19c, for example, recorded thereon. The record of measurements made by the downhole sonde 12 may thus be recorded as a function of the depth in the borehole of the sonde 12.

In the downhole sonde 12, a neutron generator 21 is supplied with high voltage (approximately 100 kilovolts) by a high voltage power supply 22. Control and telemetry electronics 25 are utilized to supply control signals to the high voltage supply and the neutron generator 21 and to telemeter information measured by the downhole instrument to the surface via the logging cable 13.

Longitudinally spaced from the neutron generator 21 are two radiation detectors 23 and 24. Radiation detectors 23 and 24 may comprise, for example, thallium activated sodium iodide crystals which are optically coupled to photomultiplier tubes. The detectors 23 and 24 serve to detect gamma radiation produced in the surrounding formations 20 resulting from the action of the neutron generator 21 in emitting neutrons. A neutron shielding material 28 having a high density matter content or large scattering cross-section is interposed between the neutron generator 21 and the dual spaced detectors 23 and 24, in order to prevent direct irradiation of the detectors by neutrons emitted by the neutron generator 21. Shielding 29 may also be interposed between the detectors 23 and 24 if desired.

Upon activation of the neutron generator 21, a burst, or pulse, of neutrons of approximately 10–30 microseconds duration is initiated and emitted into the well borehole 10, borehole fluid 11, and through the steel casing 26 and cement layer 27 surrounding the steel casing into the earth formations 20 being investigated. The neutron burst is moderated or slowed down by scattering interactions such that the neutrons are all essentially at thermal energy. The thermalized or thermal neutrons then begin capture interactions with the elemental nuclei of constituents of the earth formations 20 and pore spaces contained therein.

The capture of neutrons by nuclei of elements comprising the earth formations 20 and their pore spaces produces capture gamma rays which are emitted and impinge upon detectors 23 and 24. A voltage pulse is produced from the photomultipliers of detectors 23 and 24 for each gamma ray so detected. These voltage pulses are supplied to the electronics section 25, counted in a digital counter, and are telemetered to the surface via a conductor 16 of the well logging cable 13. At the surface, a surface electronics package 17 detects the telemetered information from the downhole sonde 12 and performs suitable processing, by methods known in the prior art, to determine the measured quantities, which are then supplied to the recorder 18 where they are recorded as a function of borehole depth.

The processing of the telemetered information according to the present invention includes computing both narrow and wide digital moving average of the log data for each of the detectors. This may be done using suitable moving-average filter techniques known in the art. As will be appreciated by those skilled in the art, the terms "narrow" and "wide", as used in this specification and in the claims, are meant to be understood as relative terms only. The specific width, whether narrow or wide, will depend on the specific application, equipment being used, borehole and formation responses, and so forth. These can be readily and easily selected using already known techniques. From the standpoint of the present invention, therefore, the significance is that intervals of different widths are used, the wider one furnishing greater statistical dampening, and the narrower one providing better bed resolution.

As will also be appreciated, the same concepts and techniques can be used even with a single detector system if data from both shallow and deep radii of investigation is being generated. This will be the case, for example, in a system (e.g., a pulsed neutron log) having multiple gates in one detector, instead of (or in addition to) multiple detectors.

Figure 2:
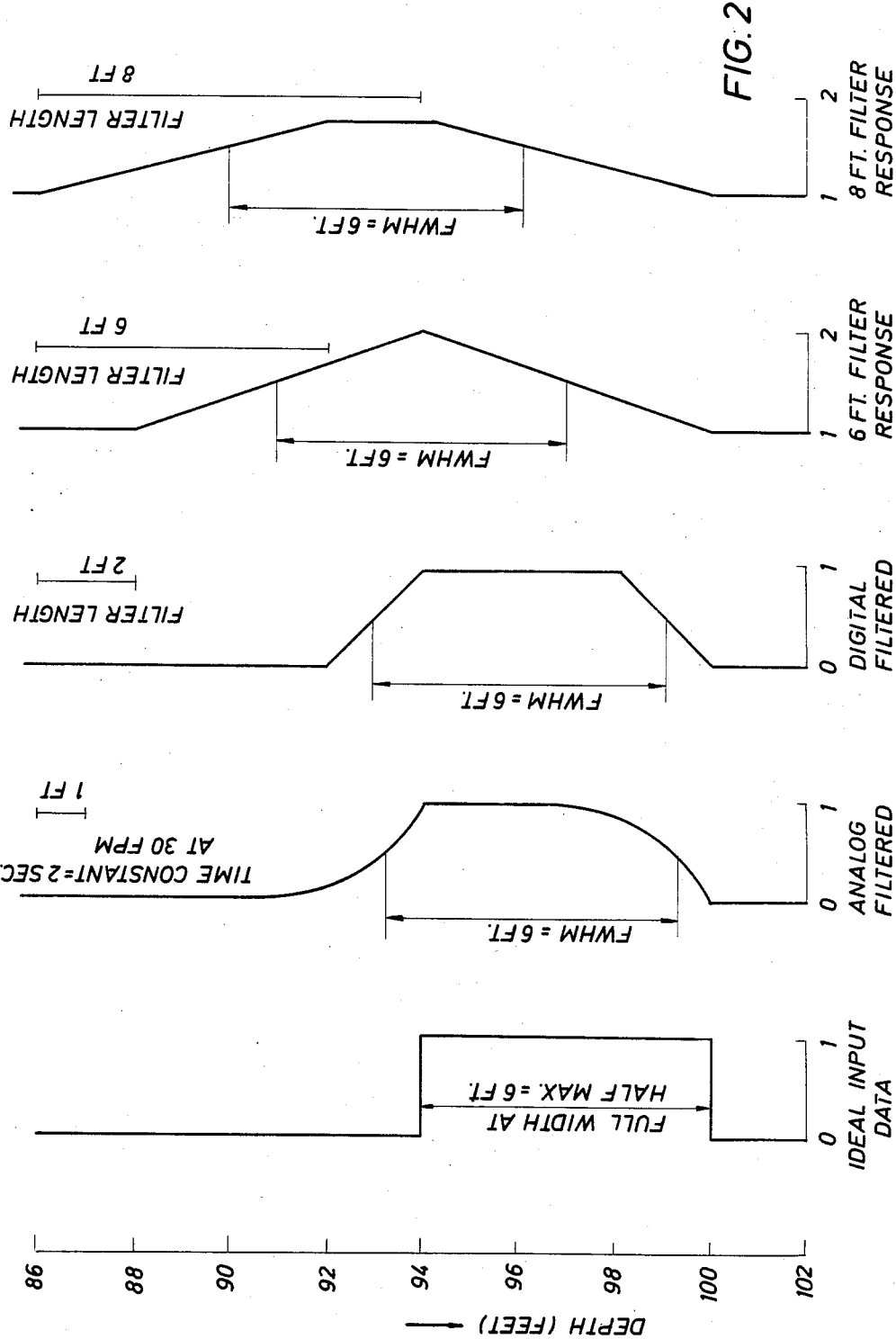
FIG. 2 is a graphical illustration of the response of moving-average filters of various lengths across simulated formation changes.

As discussed earlier, a moving-average filter is basically a running average of data samples. When a new sample is obtained, the oldest sample is deleted and a new average is calculated from the new sample plus the remaining samples. Filtering the data samples reduces statistical fluctuations that are often excessive between individual samples. However, both analog and digital filters usually have the undesirable effect of also smoothing out true formation changes. The longer the filter "length" (roughly equivalent to the length of the borehole interval being "averaged" or otherwise processed), the more severe the degradation in resolution. FIG. 2 illustrates this degradation in resolution for particular analog and digital filters. An ideal step shape, without statistics, was used as input data. The step which was chosen had a full width at half maximum (FWHM) of 6 feet. For a typical logging speed of 30 fpm, an exponential time constant of 2 seconds was selected for the analog filter. A filter length (averaging interval) of 2 feet was used for the first digital moving-average filter. These parameters would be expected to yield the same reduction in statistics from both filters with actual data. Also represented are digital moving-average filter lengths of 6 feet and 8 feet.

The analog filter shows an asymmetric and nonlinear response in FIG. 2, while the digital filter response are symmetrical and linear. The analog filter required 3 feet (or 6 seconds, at 30 fpm) to reach about 95% of its full response, but the 2 ft. digital filter took only 2 feet to reach full response. Both filters gave the correct full width at half-maximum for the 6 ft. thick ideal formation. The formation mid-point was delayed slightly less with the analog than with the digital filter (about 0.69 versus 1.0 ft.). Overall, it would appear that the 2 ft. digital filter gave preferable formation response. However, although all the digital moving-average filters produce a linear and symmetric response across formation bedding, as the filter length increases (FIG. 2), resolution of thin formations deterioates. As can be seen, a formation that is thinner than the filter length (e.g., 6 ft. bed with 8 ft. filter, FIG. 2) gives a flat-top response that could be misinterpreted as a thicker formation. An important fact is that a moving average filter cannot thus fully resolve a formation that is thinner than the filter length.

Figure 3:
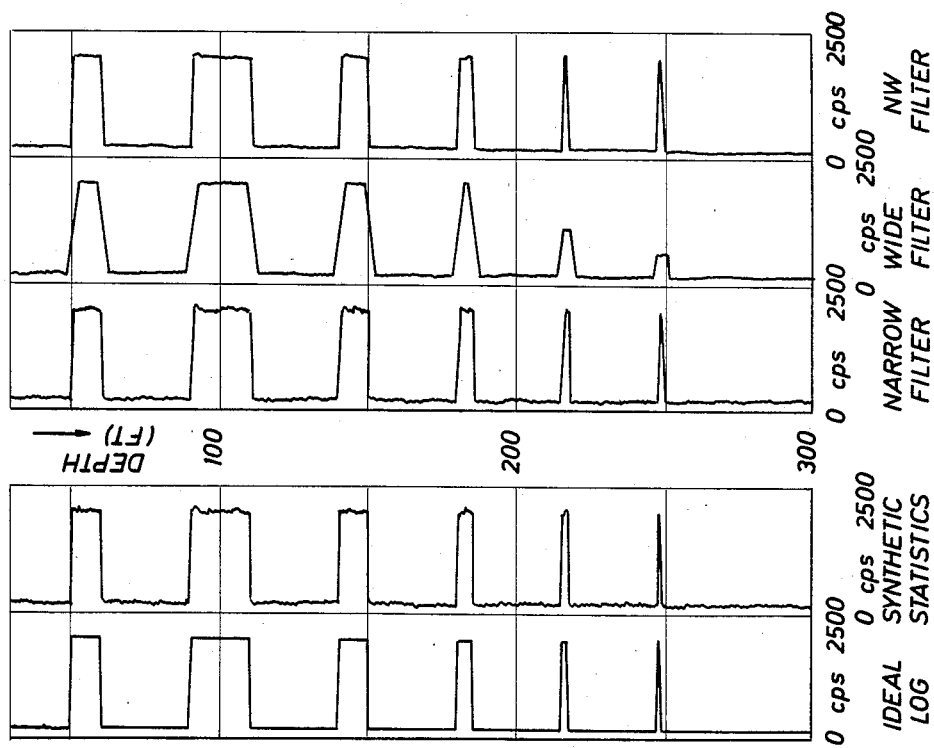
FIG. 3 is a comparative graphical illustration of the results of applying different moving-average filters to a synthetic log with large changes.

To explore and illustrate these effects further, synthetic logs were generated so that moving-average filters could be investigated with known data. As shown in FIG. 3, a ½ ft. sample interval was chosen that corresponds to a time of one second with a logging speed of 30 fpm. As shown, several formations were simulated to have ideal resolution and thicknesses of 1, 2, 5, 10, and 20 feet. Statistical variations were incorporated into the log by using a random number generator with a normal distribution. FIG. 3 then illustrates the results of applying different moving-average filters to a synthetic log with large changes (200 to 2000 cps). A narrow filter averaging two samples at a time (1 ft.) shows good formation resolution, while a wide filter with eight samples (4 ft.) did not fully resolve the 1 and 2 ft. thick pseudo-formations. Therefore, formations that are thinner than the filtering interval could be easily misinterpreted.

Statistical fluctuations are of greatest concern in logs with low counting rates and with relatively small formation induced rate changes. The synthetic log in FIG. 4 was constructed to simulate this with mean count rates changing between 200, 220, and 300 cps. The different scales cause the reduction in statistics with the wide filter to be more apparent in FIG. 4 than FIG. 3. Actually, in both figures the statistical standard deviations are half as large with the wide filter compared to the narrow filter.

Figure 4:
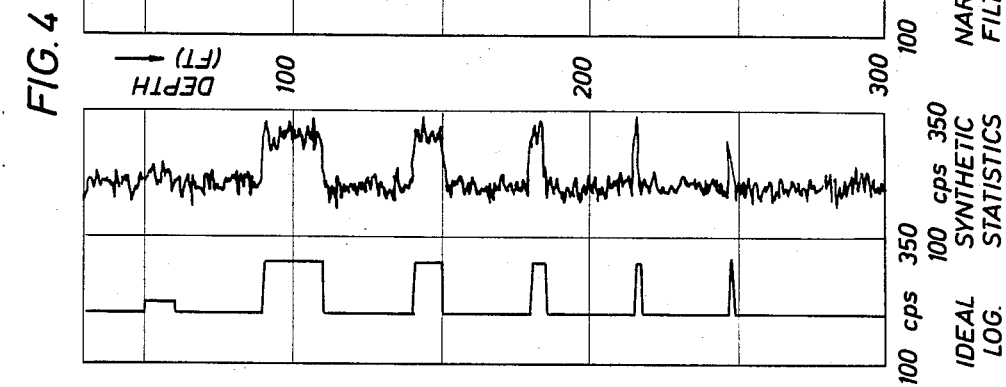
FIG. 4 is a comparative graphical illustration of the results of applying different moving-average filters to a synthetic log having small formation-induced changes.

As explained in the above-noted Schultz-Thadani paper, an improved digital statistical dampener was developed that varied adaptively between the narrow and wide filters (cf. "NW FILTER", FIGS. 3 and 4). In an optimal implementation, such a system would give the formation resolution of a narrow filter with the statistical reduction of a wide filter. In actuallty, significantly improved results were in fact obtained using the logging methods and apparatus disclosed herein, and as shown particularly in the NW filter curve in FIG. 4. It is noted, however, that the "ringing" or "spikes" referred to earlier, and identified at several places by reference numeral 30 (FIG. 4), sometimes still appeared, such that the logs could be improved upon still further, as also discussed further herein. The ringing appeared at the point where a transition was made from one moving average to another, and was caused because each moving average has its own real-time value. That is, since these values are usually not the same when the measured data is changing (because the intervals over which the averages are taken are different), when the value being logged was switched from one average to the other, the discontinuity in that value resulted in the ringing or "spike" on the log.

The basic concept is to use the wide filter results until a significant change in the count rate occurs, and then to shift to the narrow filter. As seen in FIG. 3, the NW filter gave very good results with large, abrupt changes in counting rates. For smaller changes (FIG. 4), there were slight irregularities and loss in resolution at bed boundaries, in addition to the ringing. However, peak values were obtained satisfactorily.

To explain the present invention further, it is first recognized that statistical variations follow a Poisson distribution. Since each narrow averaging interval is a subset of its wide interval, then for a mean number of counts, $LS_N$ and $LS_W$, in given corresponding respective narrow and wide time or depth intervals of the long-spaced detector, an approximation for the standard deviation for the Poisson distribution may be given by the equation:

$$\sigma(LS_N - LS_W) \cong \sqrt{\left(\frac{\Delta t_W}{\Delta t_N} - 1\right) * \frac{LS_W}{\Delta t_W}} \quad (1)$$

where $\Delta t_N$ and $\Delta t_W$ are time durations, in seconds, for the logging sonde to traverse the narrow and wide depth intervals, respectively.

We then define an averaging function $A_{LS}$ as follows:

$$A_{LS} = 0 \text{ when } |LS_N - LS_W|/\sigma(LS_N - LS_W) \geq 3 \quad (2)$$

$$A_{LS} = 0.5 \text{ when } |LS_N - LS_W|/\sigma(LS_N - LS_W) < 3 \quad (3)$$

$$A_{LS} = 1 \text{ when } |LS_N - LS_W|/\sigma(LS_N - LS_W) \leq 2 \quad (4)$$

The adaptive filtered results according to the present invention are then given by:

$$LS_{NW} = (1 - A_{LS}) * LS_N + A_{LS} * LS_W \quad (5)$$

This results in using the wide derived average when the arithmetic difference between the narrow and the wide derived averages is less than two times the statistical standard deviation from zero for the difference. When the arithmetic difference is between two and three times that standard deviation, then the mean of the wide and narrow derived averages is used. And when it is greater than three times the standard deviation, the narrow derived average is used. This implementation has produced excellent results.

Further, when a measurement with a short-spaced detector, such as detector 23 (FIG. 1) (narrow radius of investigation) is to be combined with measurements with the long-spaced detector 24 (such as by ratio, difference, or other means), the same adaptive filtering is applied to the two (or even more) measurements in order to obtain optimal formation resolution. For most nuclear logs, a short-spaced detector has a shallower radius of investigation than does a detector located at a greater distance from a source. Therefore, it is usually better to control the amount of adaptive filtering for the short-spaced detector from the deeper sensing long-spaced detector using equations 2, 3, and 4. Then the improved equation for adaptive filtering of the short-spaced detector SS is:

$$SS_{NW} = (1 - A_{LS}) * SS_N + A_{LS} * SS_W \quad (6)$$

Figure 5:
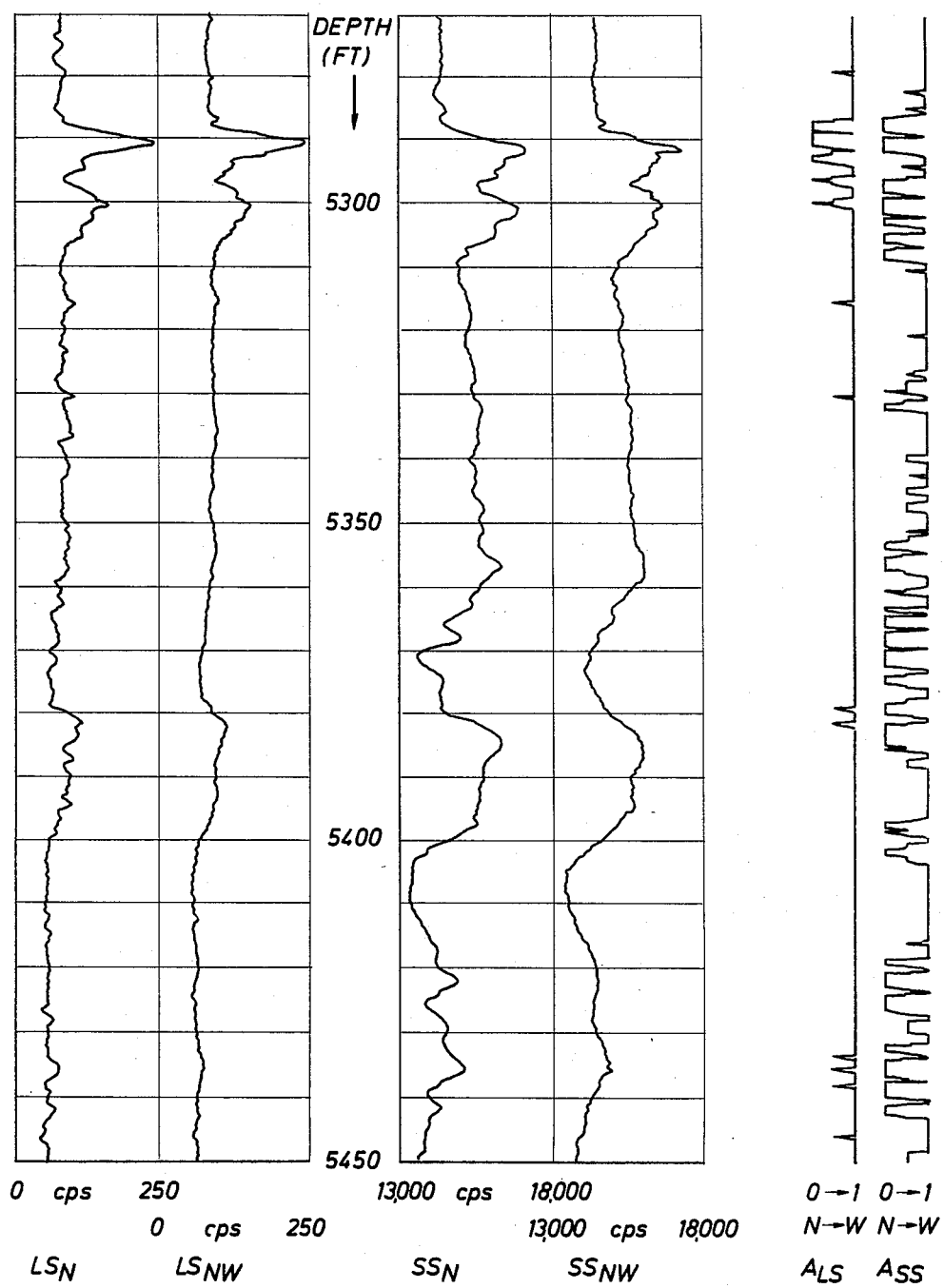
FIG. 5 is a comparative graphical illustration of the results of applying different moving-average filters to both long spaced and short spaced detectors in a dual detector nuclear logging tool.

An example of applying this technique to log data generated from a dual detector nuclear logging tool, such as illustrated in FIG. 1, is shown in FIG. 5. Individual long- and short-spaced count rate data were recorded in an interval of a cased test well beleived to be uncemented. The log was run at approximately 30 fpm and values were recorded and digitized with 0.1 ft. increments. The $LS_N$ and $LS_W$ logs were obtained by averaging over 1.4 and 5.6 ft., respectively; the $SS_N$ and $SS_W$ were obtained with 2.8 and 7 ft. averages, respectively.

From FIG. 5 it can be seen that the adaptive filtered log has retained the significant features of the narrow averaged $LS_N$ log while having greatly reduced statistical variations. The $SS_N$ and $SS_{NW}$ logs are shown on an expanded scale and the $SS_N$ log indicates features not found in the LS logs that are most likely due to variations in borehole rugosity. These borehole features have been essentially averaged-out by using the $A_{LS}$ weighting parameter in obtaining $SS_{NW}$ from equation 6.

The log shown in FIG. 5 of the $A_{LS}$ parameter indicates that the wider averages ($LS_W$ and $SS_W$) were used for almost all of the displayed interval in obtaining $LS_{NW}$ and $SS_{NW}$. The average of the $A_{LS}$ values was 0.946. A similar parameter ($A_{SS}$) was determined from the SS data and had an average value of 0.626. Therefore, the $SS_N$ and $SS_W$ averages were statistically different much more often than the $LS_N$ and $LS_W$ averages. This phenomenon is believed to be related to the greater sensitivity to borehole rugosity of the SS detector.

More specifically, a borehole rugosity indicator BRI may be defined as follows:

$$BRI = A_{LS} - A_{SS} \tag{7}$$

Then, when BRI=0, both weighting parameters are in agreement, which implies either a uniform formation or a statistically significant formation change in a well, which implies good borehole conditions. When BRI<0, the LS has sensed a change while the SS has not. This most likely implies a formation change which was not observed by the SS because of a washed-out borehole (filled with mud or cement). When BRI >0, the SS has sensed a change while the LS has not. This indicates a rugose borehole with a uniform formation.

In the preferred embodiment, therefore, borehole rugosity is essentially determined by deriving from the shallow measurement data a first signal indicative of the variations in the shallow data relative to (e.g., in excess of) the variations in the shallow data which would be attributable to count rate statistics. (The variations attributable to count rate statistics would be those statistical variations commonly referred to as "noise". Variations outside the noise envelope would then be the "first signal". Note that any signal within the envelope would not be seen since, by definition, it would ordinarily be indistinguishable from the noise.) The determination of borehole rugosity is continued by deriving from the deep measurement data a second signal indicative of the variations in the deep data relative to the variations therein which would be attributable to count rate statistics. Then, as described above, an output signal indicative of borehole rugosity is derived from the first and second signals.

As may be seen, therefore, the present invention has numerous advantages. The technique is well suited to real-time processing with a wellsite computer. All that is required is calculating two moving averages for each depth of investigation, and making the proper transitions between the narrow filter, the mean value, and the wide filter. The invention encompasses further improvements as well. For example, additional intermediate steps may be used as desired; additional filters may be used (such as a low pass output filter, cascaded output filter, etc.). Preferably, the deep and shallow measurements will also each be initially filtered, using any known suitable technique, so that the vertical resolutions of the two measurements are the same, thereby eliminating any ambiguity between thin bedding effects and borehole rugosity effects in the derivation of the rugosity output signal. The present invention thus furnishes a method and apparatus which are uncomplicated in concept and implementation, capable of efficient operation in real time logging situations, inexpensive, versatile, reliable, accurate, and readily applicable to the widest possible use with nuclear well logging operations.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for processing data from nuclear borehole logs which include data from both shallow and deep radii of investigation, comprising:
   (a) deriving from the shallow measurement data a first signal indicative of the variations in the shallow data relative to those attributable to count rate statistics,
   (b) deriving from the deep measurement data a second signal indicative of the variations in the deep data relative to those attributable to count rate statistics, and
   (c) deriving from the first and second signals an output signal indicative of borehole rugosity.

2. The method of claim 1 wherein the shallow and the deep measurement data each have narrow and wide signal averages, and wherein:
   (a) said step of deriving a first signal further comprises generating a signal having a first value when the arithmetic difference between the respective narrow and wide shallow signal averages is less than two times the corresponding deep log data statistical standard deviation from zero for the difference, a second signal when the arithmetic difference is between two and three times that standard deviation, and a third signal when the arithmetic difference is greater than three times that statistical standard deviation, and
   (b) said step of deriving a second signal further comprises generating a signal having a first value when the arithmetic difference between the respective narrow and wide deep signal averages is less than two times the corresponding deep log data statistical standard deviation from zero for the difference, a second signal when the arithmetic difference is between two and three times that standard deviation, and a third signal when the arithmetic difference is greater than three times that statistical standard deviation.

3. The method of claim 1 further comprising initially filtering the deep and shallow measurements such that the vertical resolutions of the two measurements are the same, to eliminate possible ambiguity between thin bedding effects and borehole rugosity effects in said step of deriving the output signal.

4. A method for processing data from nuclear borehole logs which include data from both shallow and deep radii of investigation, comprising:
   (a) deriving respective narrow filtered averages of the shallow and deep log data using a first relatively narrow interval, thereby yielding relatively good formation bed resolution,
   (b) deriving respective wide filtered averages of the shallow and deep log data using a second interval wider than the first, to produce a smaller statistical variation in the log data than is produced by using the narrow interval,
   (c) deriving from the deep log data a deep log index of the difference between the narrow and the wide derived averages, and
   (d) using the respective wide derived averages when the deep log index falls into a first predetermined range, a predetermined combination of the respective wide and narrow derived averages when the index falls into a second predetermined range, and the respective narrow derived averages when the index falls into a third predetermined range.

5. The method of claim 4 wherein the deep log index is the arithmetic difference between the narrow and the wide deep log data derived averages, wherein the first predetermined range is the range wherein the index is less than two times the deep log data statistical standard deviation from zero for the difference, wherein the second predetermined range is the range wherein the index is between two and three times that standard deviation, and wherein the third predetermined range is the range wherein the index is greater than three times that statistical standard deviation, the third range indicating that a statistically significant change has occurred.

6. The method of claim 4 wherein each said predetermined combination of the wide and narrow derived averages is the mean thereof.

7. The method of claim 4 further comprising:
   (a) deriving from the shallow log data a shallow log index of the difference between the corresponding narrow and wide derived averages, and
   (b) indicating borehole rugosity as a function of the difference between the shallow and the deep log indexes.

8. A method for processing data from nuclear borehole logs which include data from both shallow and deep radii of investigation, comprising:
   (a) deriving respective narrow digital moving averages of the shallow and deep log data using a first relatively narrow interval, thereby yielding relatively good formation bed resolution,
   (b) deriving respective wide digital moving averages of the shallow and deep log data using a second interval wider than the first, to produce a smaller statistical variation in the log data than is produced by using the narrow interval,
   (c) deriving from the deep log data a deep log index of the difference between the narrow and the wide derived averages, the index being the arithmetic difference therebetween,
   (d) deriving from the shallow log data a shallow log index of the difference between the corresponding narrow and wide derived averages, the index being the arithmetic difference therebetween,
   (e) using the respective wide derived averages when the deep log index falls into a first predetermined range, the respective means of the respective wide and narrow derived averages when the index falls into a second predetermined range, and the respective narrow derived averages when the index falls into a third predetermined range, the first predetermined range being the range wherein the index is less than two times the deep log data statistical standard deviation from zero for the difference, the second predetermined range being the range wherein the index is between two and three times that standard deviation, and the third predetermined range being the range wherein the index is greater than three times that statistical standard deviation, the third range indicating that a statistically significant change has occurred,
   (f) indicating borehole rugosity as a function of the difference between the shallow and the deep log indexes, and
   (g) initially filtering the deep and shallow measurements such that the vertical resolutions of the two measurements are the same, to eliminate possible ambiguity between thin bedding effects and borehole rugosity effects in said step of indicating borehole rugosity.

9. Apparatus for processing data from nuclear borehole logs which include data from both shallow and deep radii of investigation, comprising:
   (a) means for deriving from the shallow measurement data a first signal indicative of the variations in the shallow data relative to those attributable to count rate statistics,
   (b) means for deriving from the deep measurement data a second signal indicative of the variations in the deep data relative to those attributable to count rate statistics, and
   (c) means for deriving from said first and second signals an output signal indicative of borehole rugosity.

10. The apparatus of claim 9 wherein said shallow and said deep measurement data each have narrow and wide signal averages, and wherein:
   (a) said means for deriving a first signal further comprises means for generating a signal having a first value when the arithemetic difference between the respective narrow and wide shallow signal averages is less than two times the corresponding deep log data statistical standard deviation from zero for the difference, a second signal when said arithmetic difference is between two and three times that standard deviation, and a third signal when said arithmetic difference is greater than three times that statistical standard deviation, and
   (b) said means for deriving a second signal further comprises means for generating a signal having a first value when the arithmetic difference between the respective narrow and wide deep signal averages is less than two times the corresponding deep log data statistical standard deviation from zero for the difference, a second signal when said arithmetic difference is between two and three times that standard deviation, and a third signal when said arithmetic difference is greater than three times that statistical standard deviation.

11. The apparatus of claim 9 further comprising means for initially filtering said deep and shallow measurements such that the vertical resolutions of the two measurements are the same, to eliminate possible ambiguity between thin bedding effects and borehole rugosity effects in the derivation of said output signal.

12. Apparatus for processing data from nuclear borehole logs which includes data from both shallow and deep radii of investigation, comprising:
   (a) respective narrow filters for deriving respective narrow filtered averages of the shallow and deep log data using a first relatively narrow interval, thereby yielding relatively good formation bed resolution,
   (b) respective wide filters for deriving respective wide filtered averages of the shallow and deep log data using a second interval wider than the first, to produce a smaller statistical variation in the log data than produced by said narrow filters, and
   (c) digital statistical dampener means for deriving from the deep log data a deep log index of the difference between the narrow and the wide derived averages, and for using the respective wide derived averages when the index falls into a first predetermined range, a predetermined combination of the respective wide and narrow derived averages when the index falls into a second predetermined range, and the respective narrow derived averages when the index falls into a third predetermined range.

13. The apparatus of claim 12 wherein the deep log index is the arithmetic difference between the narrow and the wide deep log data derived averages, wherein the first predetermined range is the range wherein the index is less than two times the deep log data statistical standard deviation from zero for the difference, wherein the second predetermined range is the range wherein the index is between two and three times that standard deviation, and wherein the third predetermined range is the range wherein the index is greater than three times that statistical standard deviation, the third range indicating that a statistically significant change has occurred.

14. The apparatus of claim 12 wherein each said predetermined combination of the wide and narrow derived averages is the mean thereof.

15. The apparatus of claim 12:
   (a) wherein said digital statistical dampener means further comprises means for deriving from the shallow log data a shallow log index of the difference between the corresponding narrow and wide derived averages, and
   (b) further comprising means for indicating borehole rugosity as a function of the difference between said shallow and said deep log indexes.

16. Apparatus for processing data from nuclear borehole logs which include data from both shallow and deep radii of investigation, comprising:
   (a) respective narrow filters for deriving respective narrow digital moving averages of the shallow and deep log data using a first relatively narrow interval, thereby yielding relatively good formation bed resolution,
   (b) respective wide filters for deriving respective wide digital moving averages of the shallow and deep log data using a second interval wider than the first, to produce a smaller statistical variation in the log data than produced by said narrow filter,
   (c) digital statistical dampener means for deriving from the deep log data a deep log index of the difference between the deep log narrow and wide derived averages, and for deriving from the shallow log data a shallow log index of the difference between the corresponding shallow log narrow and wide derived averages, each such index being the arithmetic difference of the respective narrow and wide derived averages, and for using the respective wide derived averages when the index falls into a first predetermined range, the respective means of the respective wide and narrow derived averages when the index falls into a second predetermined range, and the respective narrow derived averages when the index falls into a third predetermined range, the first predetermined range being the range wherein the index is less than two times the deep log data statistical standard deviation from zero for the difference, the second predetermined range being the range wherein the index is between two and three times that standard deviation, and the third predetermined range being the range wherein the index is greater than three times that statistical standard deviation, the third range indicating that a statistically significant change has occurred,
   (d) means for indicating borehole rugosity as a function of the difference between said shallow and deep log indexes, and
   (e) means for initially filtering said deep and shallow measurements such that the vertical resolutions of the two measurements are the same, to eliminate possible ambiguity between thin bedding effects and borehole rugosity effects.

* * * * *